Oct. 6, 1942.   G. W. BATCHELL   2,297,737
SHEET-GLASS FORMING APPARATUS
Filed June 17, 1939   4 Sheets-Sheet 1

Inventor
George W. Batchell
By [signature]
Attorney

Oct. 6, 1942.  G. W. BATCHELL  2,297,737
SHEET-GLASS FORMING APPARATUS
Filed June 17, 1939    4 Sheets—Sheet 4

Inventor
George W. Batchell
By Faust L Crampton
Attorney

Patented Oct. 6, 1942

2,297,737

UNITED STATES PATENT OFFICE 2,297,737

SHEET-GLASS FORMING APPARATUS

George W. Batchell, Toledo, Ohio

Application June 17, 1939, Serial No. 279,714

2 Claims. (Cl. 49—17)

My invention has for its object to provide a means for regulatively controlling the temperature of sheet glass as it is drawn from the forebay of a glass furnace and until it has become cooled sufficiently for severance into sheet glass parts.

The invention provides a means for directing radiant heat from the forebay to the glass sheet to maintain the liquidity of the surface glass of the sheet to eliminate wave lines from the glass, which ordinarily appear in the finally formed glass. The invention, also, provides means for controlling the temperature of the region, through which the glass is moved, by heated air under pressure to produce a substantially constant temperature differential to anneal the glass.

The invention consists in providing a heat reflector disposed in position to reflect the heat from the molten glass of the forebay of the furnace to the sheet glass and, also, the heat from the surface glass of the glass sheet, as it leaves the forebay, back to the glass of the sheet at a point somewhat remote from the forebay, to produce uniform distribution of radiant heat over the surface of the glass during initial part of its upward movement and means for regulatively cooling the glass by hot air or gases under pressure, greater than atmospheric, to produce a substantially uniform heat-transference as the glass progresses from the glass in the forebay.

The invention may be contained in structures of different forms and, to illustrate a practical application of the invention, I have selected a sheet-glass forming apparatus as an example of the various structures containing the invention and shall describe the selected apparatus hereinafter, it being understood that certain features of my invention may be used to advantage without a corresponding use of other features of the invention and without departing the spirit of the invention, as presented in the claims. The particular structure selected is shown in the accompanying drawings.

Figure 1:
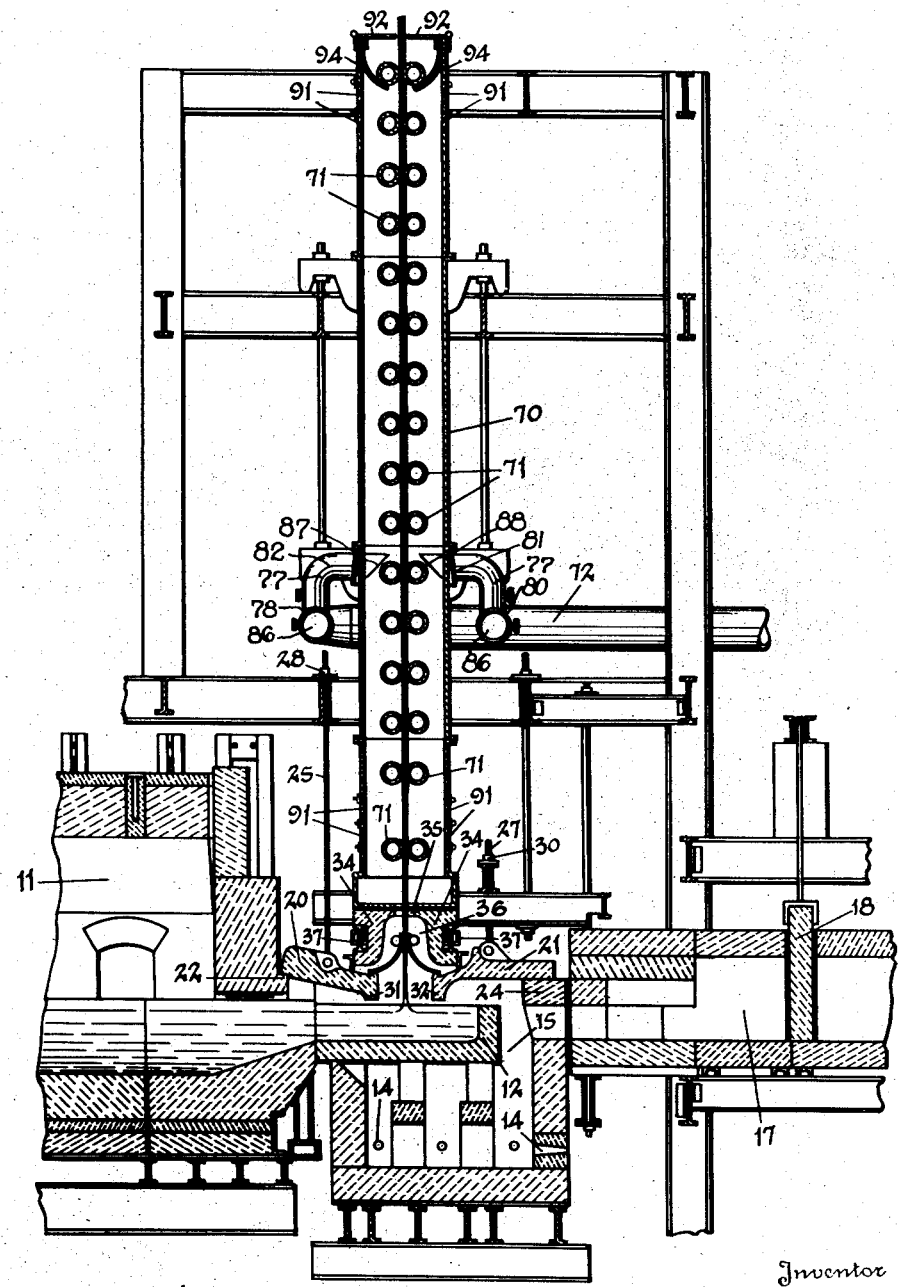
Figure 2:
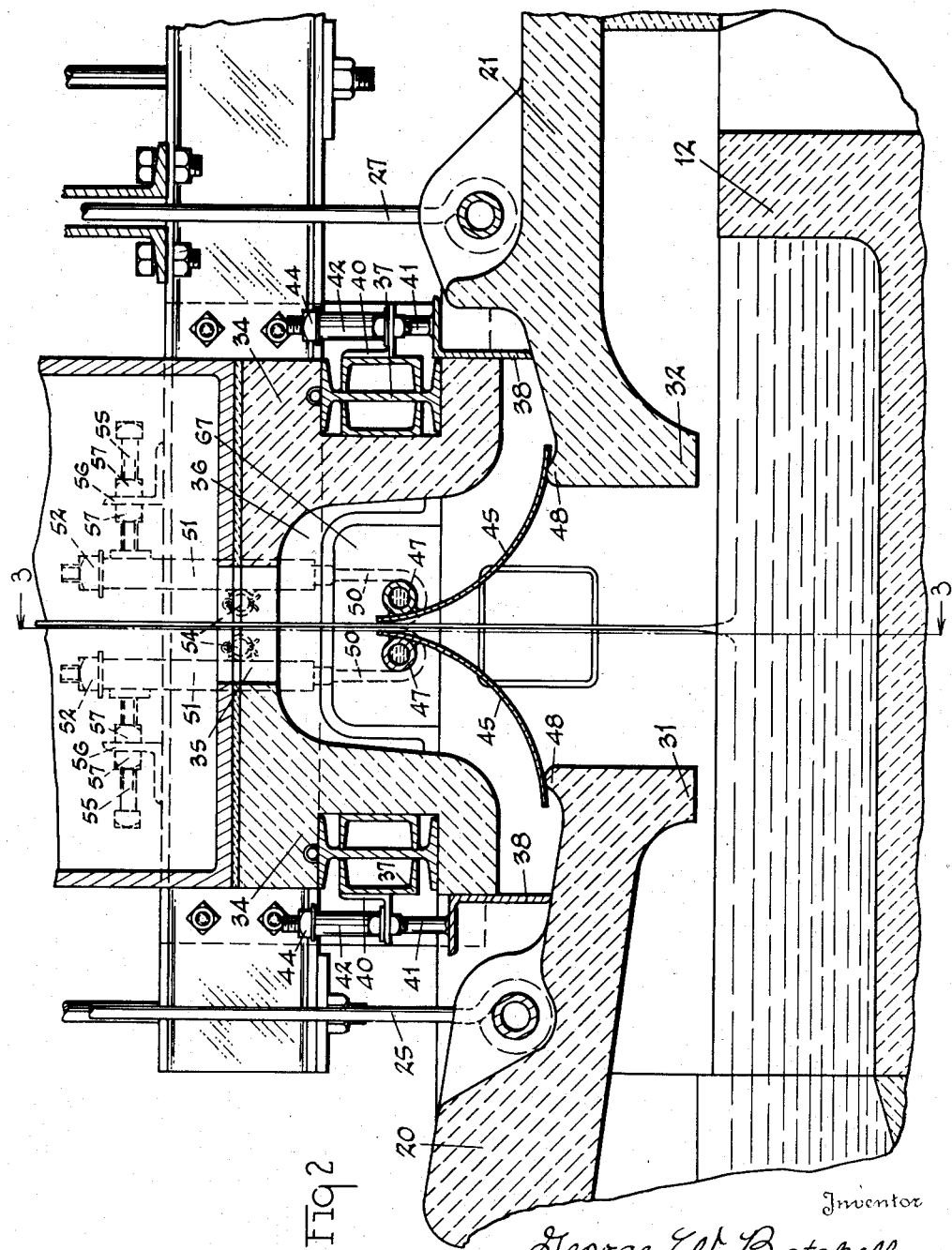
Figure 3:
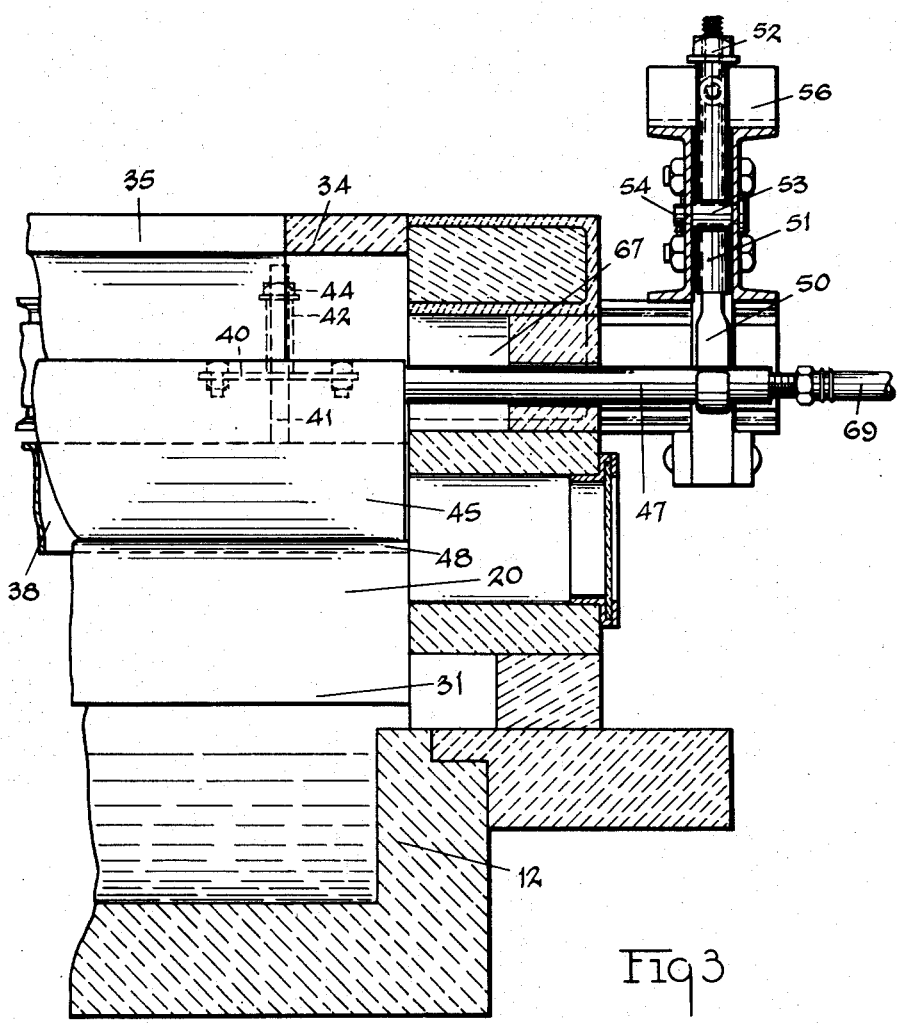
Figure 4:
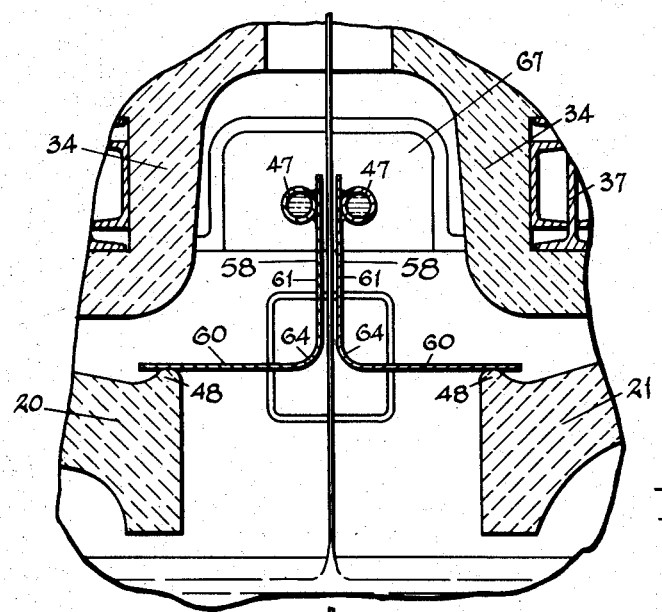
Figure 5:
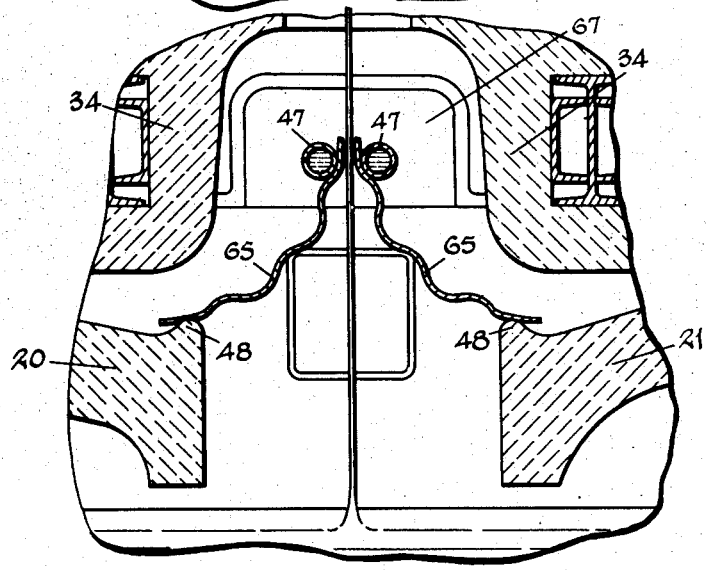

Fig. 1 of the drawings illustrates a view of a section of the forebay of a glass furnace, from which the glass is drawn in sheet form, and a tower leer for regulatively cooling the sheet glass as it is drawn from the glass of the furnace. Fig. 2 is an enlarged longitudinal section of the forebay of the furnace, from which the glass is drawn, and wherein is shown one form of a heat reflector. Fig. 3 is an enlarged transverse section of a wall part of the forebay taken on the plane of the line 3—3 indicated in Fig. 2. Fig. 4 illustrates a view of a transverse section of a modified form of a heat reflector. Fig. 5 illustrates a transverse section of a third form of a heat reflector.

The glass furnace 11 may be of any well-known type of furnace for melting glass and directing the refined glass to the forebay. The forebay 12 of the furnace may be heated by burners 14, located below the bottom of the forebay 12 and communicating, through an outlet 15, with a flue 17, to withdraw the products of combustion, as may be controlled by a gate 18.

The forebay is covered by the adjustable, overhanging, refractory blocks 20 and 21 that tilt on shoulders 22 and 24 formed on wall parts of the furnace and are sustained in overhanging relation, with respect to the glass of the forebay, by means of the rods 25 and 27 that extend through beams that form the frame of the furnace and its associated parts. The rods 25 and 27 are pivotally connected to suitable lugs or brackets that are connected to, or embedded in, the refractory blocks 20 and 21, and are provided with threaded end parts, on which are located suitable nuts 28 and 30 for adjusting the location of the blocks 20 and 21 with reference to the surface of the glass in the forebay. The blocks 20 and 21 are provided with downwardly-extending flanges 31 and 32, and the rods 25 and 27 are adjusted to dispose the lower edges of the flanges 31 and 32 in proximity to the surface of the glass in the forebay. Also, above the upper end edge portions of the blocks 20 and 21 are located a pair of channel-forming blocks 34 that are centrally spaced from each other along major portions of their inner edges to form the slot 35, through which the glass sheet is drawn. The channel 36, between the blocks, forms an elongated dome or curved ceiling, through which the sheet glass is drawn. The blocks 34 are provided, in their outer lateral surfaces, with channels, in which are located beams 37 and which are connected to the frame of the furnace and its associated parts for supporting the blocks 34 in position above the forebay 12. A pair of plates 38 (Fig. 2) are so located as to contact the outer lateral surfaces of the blocks 34 and the top surfaces of the blocks 20 and 21. The plates 38 extend across the spaces between the upper blocks 34 and the lower blocks 20 and 21 to prevent the escape of heated air or gases and, thus, completely enclose the sheet glass while in its highly heated condition as it is drawn from the glass of the forebay. The plates are supported by means of suitable brackets 40 that are secured to the channel irons or beams 37. Rods 41 are connected to the plates 38 and extend through sleeves 42 that may be, if desired, connected to the brackets 40. The upper ends of the rods 41 are threaded and suitable nuts 44 are located on the threaded parts of the rods 41 to vary the location of the plates 38 as the inner edge portions or flanges 31 and 32, of the blocks 20 and 21, are adjusted with respect to the surface of the glass and to produce desired air exits or locate the plates 38 in contact with the upper surface of the blocks 20 and 21 to close the exits and, thus, regulate the escape of heated air or gases from the region of the hotter sheet glass as it passes through the upper part of the chamber 36 of the forebay.

To maintain a continued high temperature of the surface portion of the glass as it is initially drawn from the forebay, a pair of reflectors 45 are connected to a pair of hollow rods 47 that extend through the furnace at a point above the forebay. The rods 47 are rotatably supported and connected to the upper edge portions of the reflector plates 45. The lower edge portions of the reflectors 45 rest upon rounded edge or beaded portions 48 formed on the inner end edges of the blocks 20 and 21 and, consequently, as the blocks 20 and 21 are adjusted with reference to the surface of the glass, the reflector plates 45 are tilted by angular movements of the rods 47. The ends of the rods 47 are supported on hooked ends of the rods 50 that extend through sleeves 51, and are provided with threaded end portions, on which are located suitable nuts 52 to adjust the rods with respect to the sleeves 51. The sleeves 51 are welded to bushings 53, through which pins 54 extend, the pins being secured to a part of the frame of the forebay for pivotally supporting the rods 50. The angular position of the rods 50 with respect to the forebay, is adjusted by means of the screws 55 that are connected to the sleeves 51 for free angular movements of the sleeves with reference to the screws 55. The screws 55 extend through brackets 56 located on one of the beams of the frame of the furnace and, when rotated, the screws angularly adjust the rods 47. Thus, the rods 47 may be adjusted, both vertically and horizontally, to adjust the reflector plates 45 with respect to the sheet glass as it is initially drawn from the furnace. The upper edge portions of the reflector plates 45 may be raised with respect to the sheet glass as it is being drawn from the glass of the forebay or may be, if desired, moved toward or away from the surface of the sheet glass. As the rods 47 are adjusted, the lower edge portions of the reflector plates 45 tilt and slide on the rounded edge portions 48 of the blocks 20 and 21.

The reflector plates, shown in Figs. 1 and 2 of the drawings, are, preferably, curved, polished, refractory metal plates, convex surface parts of the plates being located on the inner side with respect to the sheet glass as it is being drawn from the glass of the forebay 12. Thus, by the adjustment, the upper parts of the inner surfaces of the reflector plates 45 may be varied to extend the area of the said surface portions located in closer proximity to the lateral surfaces of the sheet glass, since by raising the upper edges of the curved plates 45, the angle between the plates will be correspondingly reduced, which brings, for example, the upper surface portions of the curved plates 45, in closer proximity to the surface of the sheet glass, while, if the rods 47 are lowered, the angle between the plates 45 is increased, which correspondingly swings the curved surfaces away from the opposite surface of the glass. Also, the lateral adjustment of the hollow rods 47, by the adjustment of the rods 50, locates the upper surface portions of the curved plates 45 more or less remote from the lateral surfaces of the glass. The angles of incidence and reflection, as between parts of the surface of the glass in the forebay and the surface of the sheet glass, may, thus, be varied. Thus, the reflected heat arising from the surface of the glass in the forebay 12 is distributed by the curved reflector plates 45 over the surface of the glass of the sheet as it is being drawn from the glass of the forebay. This causes maintenance of a relatively low viscosity or liquidity of the surface glass of the sheet glass as it is being drawn from the glass of the forebay and affords opportunity for the surface glass to re-adjust and spread itself by reason of the surface tension and, thus, eliminate all wave lines that ordinarily occur in the drawing of the sheet glass.

The reflector plates may be modified in form to vary the effective results that may be obtained by the use of the reflector plates when drawing sheet glass. The reflector plates 58, shown in Fig. 4, are, preferably, formed angular. They are each provided with substantially plane portions 60 and 61 that are integrally connected by the curved portions 64. The angular relation between the portions 60 and 61 may be varied, as may be desired, to modify the effect of the reflection of the heat on the surface of the sheet glass and, also, modify the effect of the close heat confinement by the portions 61 of the reflector plates. The length of the curved portions, and, also, the curvature of the curved portions, may be modified to vary the heat quantity that is reflected to the sheet glass from the glass of the forebay. The portions 61 of the reflector plates extend, preferably, substantially parallel to the surface of the glass to cover a considerable area of the glass in proximity to the forebay and the portions 60 operate to collect the heated air or gas and direct it to the confining spaces between the sheet glass and the portions 61 of the reflector plates to maintain the desired liquidity of the surface glass to enable readjustments to produce a uniformly smooth surface and eliminate all wave lines.

The reflector plates 65, shown in Fig. 5, are formed to disturb and reduce the effectiveness of any convective currents that may follow along the surface of the reflector plates. The general form of the reflector plates 65, shown in Fig. 5, is substantially the same as that of the reflector plates 45, shown in Fig. 2, except that the reflector plates 65 are corrugated, as shown in Fig. 5, and are located to present the general convex sides of the plates to the sheet glass as it is initially drawn from the forebay. The reflector plates 58 and 65 are, in each case, supported on rods 47 and their lower edge portions rest on the beads 48 formed on the edges of the blocks 20 and 21 and are adjusted in the same manner that the plates 45, shown in Fig. 2, are adjusted. The rods 47 extend through openings 67 in the end walls of the forebay and when the plates, such as either the plates 45, 58, or 65, have been adjusted to produce the desired results, the openings 67 are closed by suitable refractory material to prevent the escape of the heated gases from within the furnace.

In order to increase the viscosity of the surface of the glass of the sheet, in advance of its withdrawal from the forebay, water or other cooling fluid, such as air, at a desired temperature, may be directed through the hollow rods 47 to produce heat absorption from the surface of the sheet glass in the vicinity of the upper edge portions of the reflector plates 45. The heat is conducted from the edge portions of the reflector plates to the rods and the extent of the regions of the upper edge portions of the reflectors that are, thus, controllably cooled, will depend upon the effective heat differential of the cooling medium that is directed through the rods 47 and the heat of the forebay in the region of the rods. Also, the effect of the cooling medium on the surface glass may be varied by the adjustment of the rods and the upper edge portions of the reflector plates, with reference to the glass sheet. The ends of the rods 47 may be connected to pipes 69 for directing air or water, at a desired temperature and rate, through the rods 47. The flow may be controlled by a suitable valve.

As the glass is drawn from the forebay 12, it passes through the slot 35 into the tower leer 70. The leer 70 is of sufficient height to enable, according to the drawing rate of the sheet glass, annealing of the glass to eliminate all internal stresses and strains, in advance of cutting the sheet glass into plates. The leer may be formed of refractory heat-insulating material or may be formed of sheet metal and, if desired, heat-insulated by suitable heat-insulating material. Preferably, the interior part of the wall of the leer is formed of sheet metal that may be formed in sections and secured in position by a suitable frame. The leer 70 is provided with a plurality of pairs of spaced rollers 71 that are interconnected by suitable driving means for causing rotation of all the rollers at the same rate and surface engagement with the sheet glass to produce uniform rate of movement of all parts of the glass.

The temperature of the interior of the leer is regulated by directing heated air under pressure and in a quantity to maintain a pressure greater than atmospheric within, not only the leer but, also, in all of the more or less confined spaces communicating with the leer. Thus, air of any desired temperature, such as 400° to 800° F., may be introduced into the leer through a heat-insulated pipe 72, which terminates in air-distributing inlets that extend horizontally across the leer. The pipe 72 terminates in a manifold 77 comprising a pair of pipes 78 and 80 that are connected to the pipe 72, and the pipes 81 and 82 that are connected to the pipes 78 and 80, having a plurality of dampers, such as the dampers 86, for varying their effective areas to control the flow of the hot air therethrough. A pair of shells 87 and 88 are connected to the pipes 78 and 80 and located on opposite sides of the sheet glass. The shells 87 and 88 are each substantially trapezoidal in cross-sectional form and have a reticulated side inclined to the parallel sides of the shell for restricting the outflow of the air from the shell to produce longitudinal distribution of the heated air throughout the length of each of the shells.

The inclination of the reticulated sides is such as to tend to produce downward movement of the heated air as it enters the leer. The pressure of the air, thus, introduced into the leer is dependent upon the egress of the air at definite points of the leer and the passageways communicating therewith, the pressure, however, being sufficiently high to maintain the interior pressure within the leer and its communicating chambers above atmospheric pressure. The temperature of the heated air is, preferably, such that it is slightly higher than the temperature of the glass in the vicinity of the shells to prevent any chilling of the glass at the point of entrance. Preferably, all outlets that may exist are restricted to prevent other than a regulated discharge of the heated air and maintain, as far as possible, a static condition of relatively hot air within the leer and the chambers communicating therewith that surround the glass from the time that it is drawn from the forebay 12 until it is delivered from the leer. The outflow of the air and, also, its introduction into the leer are dependent largely upon the heat radiation and conduction from the wall of the leer and the heat received by the air from the glass. The hot air is supplied and its temperature is varied to produce, first, maintenance of relative high temperature and, yet, progressive cooling of the glass as it advances upward through the leer.

The movement of the heated air through the leer and its passageways may be controlled by suitable vents 91, which may be disposed at different points in the leer. In the form of construction shown in the drawings, the vents 91 are located near the upper and lower ends of the leer to cause a downward movement of a large portion of the heated air, which is further heated by radiation and conducted heat from the glass as the glass moves upward, producing thereby, a substantially uniform small temperature differential between the temperature of the glass and the temperature of the air as the air descends and the glass is raised. Some of the heated air will move upward, due to convection, and the progressing decrease of the temperature of the glass above the hot air inlets will be largely caused by the heat radiation from the walls of the leer. The rate of cooling of the glass will be controlled by the quantity of hot air that is allowed to escape from the upper end of the leer through vents 91. Hence, there will be produced a more rapid rate of cooling of the glass above the shells 87 and 88 than that produced below the shells per unit length of the leer. The glass is, thus, given opportunity to adjust itself with respect to strains and stresses that may exist in the glass as it moves through the hotter part of the leer and is cooled at a relatively rapid rate in the upper part of the leer until the glass temperature is reduced to a point such that when the glass sheet is delivered from the leer it may be cut into sheets of the desired size. The hot air that descends from the shells 87 and 88 may pass through the slot 35 formed between the blocks 34 and through the spaces between the edges of the plates 38 and the blocks 20 and 21 and thereby cool the glass above the reflector plates in advance of contact with the lowermost of the pairs of rollers 71 and without affecting the glass temperature produced or existing intermediate the reflector or plates 45.

The upper end of the leer may be provided with a pair of gates 92 located on opposite sides of the glass, that may be opened when it is desired to manipulate the glass for any purpose when it passes the uppermost rollers 71. A pair of elastic flexible wipers 94 are located so as to contact the surface of the uppermost pair of rollers 71 for substantially closing the upper end part of the leer and, thus, prevent the escape of any more of the air than is necessary to maintain the temperature of the air within the upper end of the leer at a proper cooling temperature, which is one that is somewhat greater than that of the exterior atmosphere.

The temperature of the leer is maintained substantially constant within any horizontal cross-sectional area of the leer, while the temperature from the lower end of the leer progressively decreases but slightly to the point at which the hot air inlet shells 87 and 88 are located and it decreases from the shells to the upper end of the leer at a more rapid rate.

The temperature of the air, thus, moving downwardly, raises to a point that is substantially the same as the temperature of the air introduced into the leer through the manifold 77. The air above the inlet shells 87 and 88 and at the upper end of the leer being somewhat more static because of the escape of a lesser quantity of air through the upper end of the leer, the glass cools rapidly by radiation of the heat from the wall of the leer. This produces a more rapid cooling of the glass so that when the glass is discharged from the upper end of the leer, the glass may be cut into sheets of desired size.

I claim:

1. In combination with a glass furnace having a forebay, and means for drawing sheet glass upwardly in a plane from the forebay; a pair of corrugated, heat-resisting, polished, sheet metal plates having upper edge portions located in close, heat-confining relation with respect and parallel to the lateral surfaces of the sheet glass and extending outwardly from the sheet glass and the said plane and from above the initially formed glass and downward toward the glass of the forebay and to a point in the vicinity of the glass of the forebay for producing reflection of the heat of the glass of the forebay to the glass of the sheet as the sheet is drawn from the glass of the forebay and initially formed.

2. In combination with a glass furnace having a forebay, and means for drawing sheet glass from the forebay in a vertical plane; a pair of polished, sheet metal, heat-resisting plates located on opposite sides of the said plane; a pair of water-cooled pipes for pivotally supporting the upper ends of the plates, the plates extending from opposite sides of the said plane and contiguous to the said plane and downwardly and away from the said plane and over the glass of the forebay to reflect the heat of the forebay to the surface of the glass of the sheet as it is being drawn from the forebay; a pair of adjustable blocks spaced from said plane and extending downwardly from the lower ends of the plates to near the surface of the glass of the forebay and forming an enclosure between the blocks and the plates; means for adjusting the height of the said blocks and operative to tilt the said plates toward and away from the said plane; means located exterior to the forebay for raising and lowering the pipes to raise and lower the upper ends of the plates and vary the angle of the plates with reference to each other and the said plane; the forebay having a dome located above the glass of the forebay and having a chamber through which the said plane extends and formed above the said plates and blocks; a pair of plates located intermediate the adjustable blocks and the outer lateral surfaces of the said dome; and means for adjusting the last named pair of plates upon the adjustment of the said blocks to regulate the effective area of opening between the blocks and the lower surface of the dome.

GEORGE W. BATCHELL.